WARNING CONTROL SYSTEM FOR DICTATING MACHINES

Filed Dec. 3, 1959

INVENTORS
JACK W. BROWN
HARRY E. CROCKER
BY George H. Fritzinger
AGENT

United States Patent Office 3,061,688

Patented Oct. 30, 1962

3,061,688

WARNING CONTROL SYSTEM FOR DICTATING MACHINES

Jack W. Brown, Elizabeth, and Harry E. Crocker, West Orange, N.J., assignors to McGraw-Edison Company, Elgin, Ill., a corporation of Delaware Filed Dec. 3, 1959, Ser. No. 857,044

7 Claims. (Cl. 179—100.1)

Figures 1, 2:
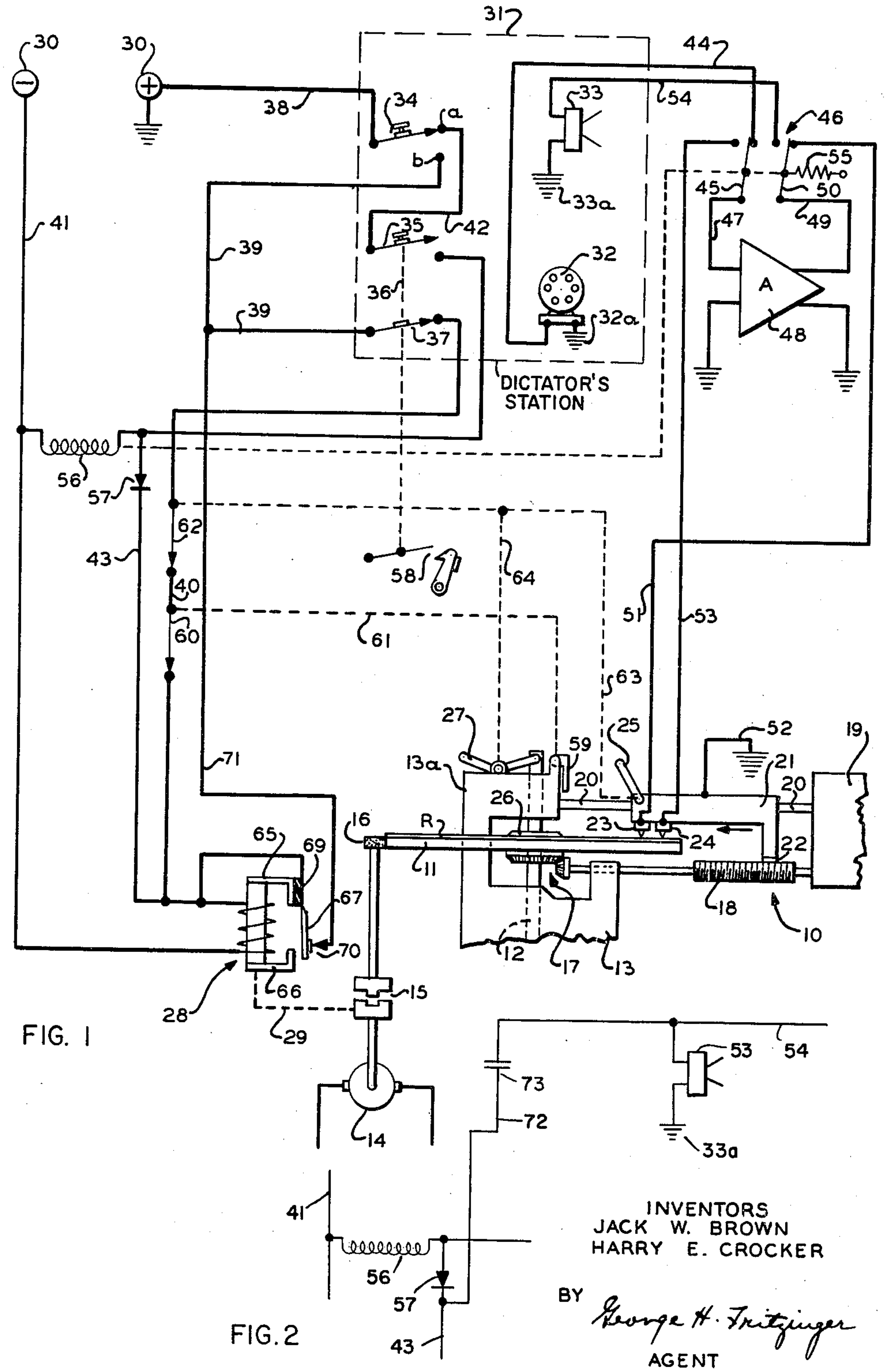

This invention relates to machines for recording and reproducing dictation, and more particularly it relates to a simplified system for providing a warning sound or other signal whenever the dictator attempts to start the machine while it is not properly conditioned for its intended operation.

The invention resides in particular in a simplified electromechanical system for carrying out the warning functions broadly described and claimed in the Kobler Patent No. 2,864,891, dated December 16, 1958, and having common ownership with the present application.

These machines have different manual controls, typically separate record and reproduce start-stop controls, a shiftable head carriage, record-reproduce conditioning controls, and a record clamping mechanism differently responsive according to whether or not a record is mounted on the turntable. These several controls must be placed in respective predetermined positions else the machine will not operate to record dictation and any dictation spoken into microphone will be lost.

An object of the invention is to provide a very simple control system to provide a warning signal whenever the machine is started for recording dictation but is not properly conditioned to perform its intended purpose.

Specifically, the present warning system is adapted to operate whenever the dictator presses the record start-stop control while any one of the following conditions is present: (1) the reproducer start-stop control is in start position, (2) the machine is conditioned for reproducing, (3) the carriage has reached the end of its recordation range, (4) the record is not secured to the turntable, and (5) the record clamp is operated without a record having been mounted on the turntable.

Distinct features of the invention reside in using the start-stop electromagnet as a buzzer or vibrator should the record start-stop control be pressed when the machine is not properly conditioned for recording dictation, and further in so employing the start-stop electromagnet selectively for this dual function with the use of very simple circuitry.

These and other objects and features of the invention will be apparent from the following description and the appended claims.

In the description of the invention reference is had to the accompanying drawings, of which:

FIGURE 1 is a schematic circuit diagram of the present dictating machine illustrating the invention; and FIGURE 2 is a view of a portion of the circuit diagram of FIGURE 1 showing a modification thereof.

With reference to FIGURE 1, there is shown a dictating machine 10 having a record support in the form, for example, of a turntable 11 journaled at 12 in a frame 13 fractionally shown. The turntable is rotated by a motor 14 coupled through a clutch 15 to a drive wheel 16 frictionally engaging the rim of the turntable. The turntable is coupled through right-angle gearing 17 to a feed screw 18 journaled at one end in a frame 13 and at the other end in a frame 19. The frame 13 has an upper portion **13*a* overhanging the turntable to support between it and the frame 19 a guide rod 20 for a carriage 21. The carriage has a depending arm carrying a feed nut 22 which normally engages the feed screw to cause the carriage to be driven progressively as in a leftward direction when the turntable is rotated. Record and reproduce translating devices 23 and 24 are mounted shiftably on the head carriage for selective engagement with a record R on the turntable. These translating devices may be of any suitable type such, for example, as magnetic heads adapted to engage a magnetic record medium or electromechanical heads provided with respective styli for cutting or embossing grooves in a record medium, the latter being shown in the drawing purely by way of illustration. In any event, the heads are shifted into and out of selective engagement with the record R as by a control lever 25** on the carriage having record and reproduce positions, the operation being typically such that both recorder and reproducer styli are engaged with the record when the lever is in its record position and only the reproducer stylus is engaged with the record when the lever is in its reproduce position. Also, the recorder head is typically spaced at a short distance ahead of the reproducer stylus with respect to the direction of travel of the carriage so that a quick review of the last portion of one's recorded dictation is made possible at any time simply by switching the circuitry constituting the audio system from its record to reproduce conditions.

Mounted in the overhanging frame portion **13*a* is a record clamp 26 suitably spring biased to engage the central hub portion of a disk record and to hold it in fixed relation to the turntable as the turntable is rotated. This record clamp can be released at will to permit a record to be removed and a second record to be mounted by pressing a lever 27 pivoted to the frame portion 13*a* and engaging the shaft of the record clamp. Further, there may be associated with the record clamping mechanism a safety device as described in the Dietz Patent No. 2,793,864, dated May 28, 1957, which withholds a lowering of the translating means onto the turntable as the record clamp is actuated unless a record disk is first mounted on the turntable. Details of this mechanism need not however be herein described for the purposes of the present invention. Also mounted on the overhanging frame portion 13*a* is a lever 59** projecting into the path of the carriage so that it is operated by the carriage when the latter enters the end portion of its travel. Operation of this lever is adapted to stop the machine as is hereinafter described.

Control of the clutch 15 is by means of a start-stop electromagnet 28 suitably coupled to one section of the clutch 15 as indicated by the tie line 29 in the drawing. The clutch is biased into open position and is engaged whenever the electromagnet is energized. The clutch electromagnet is operated from a suitable current supply, preferably a source of direct current as indicated by the plus and minus terminals 30.

The dictator's handpiece or station is diagrammatically represented by the dash-dot enclosure 31 in the drawing. This station includes a microphone 32, a receiver or speaker 33, a first pushbutton start-stop switch 34 for activating the clutch electromagnet 28 when the machine is conditioned for recording, and a second pushbutton start-stop switch 35 for activating the clutch electromagnet when the machine is conditioned for reproducing. Coupled mechanically to the reproduce start-stop switch 35 as indicated by the tie-line 36 is a switch 37. When the record switch 34 is pressed into its start position the clutch electromagnet is energized from the direct current source 30 to engage the clutch and start the machine running, the circuit for the clutch electromagnet being from the plus terminal 30 via lead wire 38, switch 34 at its "*b*" contact, jumper 39, switch 37, lead wire 40, electromagnet 28 and return lead wire 41 to the minus terminal 30. When the reproduce switch 35 is pressed closed the clutch electromagnet 28 is energized by a circuit running from the plus terminal 30 through lead wire 38, switch 34 at its "a" contact, jumper 42, switch 35, lead wire 43, electromagnet 28 and return lead wire 41.

The audio circuits of the machine are shown single line with a common ground for purposes of simplying the drawing and the description. During recording, the audio circuit runs from ground 32a through microphone 32, lead line 44, pole 45 of interchange switch 46 at its right contact, lead wire 47, amplifier 48, lead wire 49, pole 50 of interchange switch 46 at its right contact, lead wire 51 and recorder 23 to ground at 52. The audio circuit during reproducing runs from ground 52 through reproducer 24, lead wire 53, pole 45 of interchange switch 48 at its left contact, lead wire 47, amplifier 48, lead wire 49, pole 50 of interchange switch 46 at its left contact, lead wire 54 and speaker 33 to ground 33a.

The interchange switch is biased as by a spring 55 into record position and is shifted to reproduce position by a relay coil 56 connected between the lead wires 41 and 43. When the reproduce start-stop switch 35 is pressed closed to start the machine, the relay coil 56 is energized from the source 30 to place the audio system into reproduce condition. In order that this relay 56 will not be activated when the record start-stop switch is pressed closed, a rectifier 57 is connected serially in the line 43 and poled to oppose any flow of direct current to the relay via the record start-stop switch 34, switch 37, lead line 40 and lead line 43.

If the dictator wishes only a quick review of the last portion of his recorded dictation—i.e., a short playback of his recorded dictation encompassed between the recorder and reproducer styli on the record—the dictator need only to press the reproduce start-stop switch 35 closed, leaving the recorder on the record to describe a continuous blank groove during the quick review operation. However, if the dictator desires to listen back to some earlier portion of his recorded dictation, he must shift the lever 25 to reproduce position to lift the recorder from the record and then backspace the carriage to the desired position before pressing the reproduce start-stop switch 35. Since it may be desirable to reproduce continuously long portions of recorded dictation, the reproducer start-stop switch may be latched in start position as by any suitable latch indicated at 58. When the carriage 21 nears the end of the record it operates the lever 59 aforementioned. This lever is coupled to a switch 60, as indicated by the tie line 61, to open the lead line 40 of the clutch electromagnet circuit and stop the machine. Also, there is another switch 62 in the lead line 40 which is coupled to both the record-reproduce lever 25 and record clamping lever 27, as indicated by the tie lines 63 and 64, to hold open the clutch circuit for recording when the recorder head is not lowered for engagement with a mounted record and/or a record is not mounted on and secured to the turntable.

It is important, as beforementioned, to safeguard as far as possible against users of dictating machines ever speaking into the microphone and pressing the record start-stop switch to attempt to record dictation while the machine is not otherwise in a proper condition for recording. As is described in the aforesaid Kobler Patent No. 2,864,891, a pressing of the record start-stop control whenever the machine is not properly set in all respects for recording will cause a buzzer to be actuated to warn the user against then attempting to record dictation. The present invention provides a warning signal under the same conditions but by a simpler and more economical means.

In carrying out the invention the clutch electromagnet 28 is operated as a vibrator whenever the record start-stop control is pressed closed while the machine is not properly conditioned for recording. To this end the electromagnet 28 is provided with a vibrator mechanism comprising two L-shaped magnetic pole pieces 65 and 66 secured to the ends of the core of the electromagnet. These pole pieces are bridged by a vibratable magnetic armature 67 secured to one end of a cantilever spring 68 which is in turn secured at its other end via an insulating bar 69 to one pole piece 65. The armature stands normally at a clearance distance from the other pole piece 66, and carries one element of a pair of normally closed interrupter contacts 70. Control of the electromagnet to cause it to operate selectively as a clutch actuator or vibrator is carried out simply by providing a vibrator circuit 71 connected through the interrupter contacts 70 in parallel with the portion of the clutch electromagnet circuit 40 between the clutch electromagnet 28 and the record start-stop switch 34, and providing this portion of the clutch electromagnet circuit with the switches 37, 60 and 62 controlled according to the condition of the machine as before-described. When the start-stop control 34 is pressed closed while the machine is properly conditioned for recording the clutch electromagnet 28 is energized continuously via the circuit 40 in preference to the vibrator circuit 71 with the interrupter contacts and as a result the electromagnet is operated to engage the clutch and start the machine. However, when the record start-stop switch 34 is pressed closed while any of the following conditions are present: (1) the reproduce start-stop switch 35 is pressed closed opening the switch 37, (2) the carriage has reached the end of its travel opening the switch 60, or (3) the recorder is not lowered into its operative position on the record or a record is not mounted on and secured to the turntable in either event opening the switch 62, the electromagnet is energized via the interrupter contacts 70 causing the electromagnet to operate as a vibrator.

During the operation of the electromagnet as a vibrator the armature 67 is vibrated against the pole piece 66 to produce a warning sound apprising the dictator that the machine is not in condition for recording. Alternatively, instead of relying on a mechanical sound produced by the vibrator an electrical connection 72 may be provided between one side of the electromagnet and the speaker 33 through an isolating condenser 73 to feed an electrical signal to the speaker and cause a warning signal to be reproduced at or near the dictator, as shown in FIGURE 2.

The particular embodiment of our invention herein shown and described is intended to be illustrative and not limitative of our invention since the same is subject to many changes and modifications without departure from the scope of our invention, which we endeavor to express according to the following claims.

We claim:

1. In a dictating machine including a record support, record-cooperable translating means and drive means for providing a relative scanning movement between the record support and translating means: the combination of an electro-magnetic device effective when continuously energized to start said drive means, a first circuit including a start-stop switch for continuously energizing said electromagnetic device to start said drive means, vibrator means associated with said device including a pair of interrupter contacts, a second circuit including said start-stop switch and operable when said first circuit is in a disabled condition for energizing said device via said interrupter contacts to cause the device to operate as a vibrator without starting said drive means, conditioning means for said machine required to be in a predetermined position to enable said machine to operate when said drive means is started, and switch means in said first circuit controlled by said conditioning means for disabling said first circuit and causing said device to be energized via said interrupter contacts upon said start-stop switch being moved to start position while said machine is not conditioned for operation.

2. The combination set forth in claim 1 including a second start-stop switch, a plurality of separately adjustable means having respective predetermined settings to place said machine in operating condition for recording when said first start-stop switch is moved to start position and having also respective predetermined settings to place said machine in operating condition for reproducing when said second start-stop switch is moved to start position, said first circuit serially including a switch which is opened responsive to said second start-stop switch being shifted to start position and a switch which is opened responsive to said respective adjustable means being shifted out of its setting for conditioning said machine for recording whereby upon moving said first start-stop switch to start position while said machine is not in operable condition for recording said electromagnetic device is energized via said second circuit to cause the same to operate as a vibrator.

3. The combination set forth in claim 1 including a second start-stop switch, a third circuit for energizing said electromagnetic device to start said machine, said third circuit being completed via said first start-stop switch in stop position and said second start-stop switch in start position, and means for disabling said first circuit responsive to movement of said second start-stop switch to start position.

4. The combination set forth in claim 1 comprising shiftable means for selectively conditioning said machine for recording and reproducing, and current energizable means connected to said third circuit for operating said shiftable means to reproducing position responsive to shifting said second start-stop switch to start position while said first start-stop switch is in stop position.

5. The combination set forth in claim 4 including a rectifier connected in said third circuit between the point where said current energizable means is connected thereto and the point where said electromagnetic device is connected thereto, said rectifier being poled to prevent flow of current to said current energizable means from said first circuit when only the first of said start-stop switches is shifted to start position to start said machine as a recorder.

6. In a dictating machine including a record support, record-cooperable translating means and drive means including a clutch for providing a relative scanning movement between the record support and translating means: the combination of an electromagnetic device for operating said clutch, a first circuit including a start-stop switch for supplying current to said electromagnetic device to engage said clutch, a vibrator associated with said electromagnetic device and including a pair of interrupter contacts, a second circuit including said start-stop switch and interrupter contacts for supplying current to said device to cause the same to operate as a vibrator, shiftable means for placing said machine into and out of operable condition for recording, and switch means controlled by said shiftable means for disabling said first circuit and causing said electromagnetic device to be operated as a vibrator via said second circuit upon said start-stop switch being operated to start position while said machine is out of operable condition for recording.

7. In a dictating machine including a record support, record-cooperable translating means and drive means for providing a relative scanning movement between the record support and translating means: the combination of an electromagnetic device effective when continuously energized to start said drive means, vibrator means associated with said device including a pair of interrupter contacts and effective when said device is energized via said interrupter contacts to cause the device to operate as a vibrator without starting said drive means, conditioning means for said machine required to be in a predetermined position to enable said machine to operate when said drive means is started, and circuit means including a start-stop switch for energizing said electromagnetic device, said circuit means including switch means controlled by said conditioning means for causing said electromagnetic device to be energized continuously when said start-stop switch is closed while said conditioning means is in said predetermined position and for causing said electromagnetic device to be energized via said interrupter contacts and to operate as a vibrator when said start-stop switch is closed while said machine is out of said predetermined condition.

References Cited in the file of this patent

UNITED STATES PATENTS

| | | |
|---|---|---|
| 2,800,531 | Kobler | July 23, 1957 |
| 2,844,661 | Kobler | July 22, 1958 |